United States Patent [19]
Lloyd et al.

[11] Patent Number: 4,731,856
[45] Date of Patent: Mar. 15, 1988

[54] AUTOMATIC ASSEMBLY APPARATUS

[75] Inventors: Philip R. Lloyd, South Nutfield; Barry M. Jones, Crawley; Peter Saraga, Wallington; David R. Humphreys; Clive V. Newcomb, both of Horley, all of England

[73] Assignee: U.S. Philips Corporation, New York, N.Y.

[21] Appl. No.: 18,869

[22] Filed: Feb. 24, 1987

Related U.S. Application Data

[63] Continuation of Ser. No. 541,947, Oct. 14, 1983, abandoned.

[30] Foreign Application Priority Data

Oct. 18, 1982 [GB] United Kingdom ................. 8229671

[51] Int. Cl.⁴ ............................................. G06K 9/46
[52] U.S. Cl. ....................................... 382/8; 358/101; 382/37
[58] Field of Search ................. 382/37, 8, 50; 358/101

[56]  References Cited
  U.S. PATENT DOCUMENTS

| | | | |
|---|---|---|---|
| 3,986,007 | 10/1976 | Ruoff, Jr. ............................. | 358/101 |
| 4,147,930 | 4/1979 | Browne et al. ................. | 250/223 R |
| 4,484,166 | 11/1984 | Osinga et al. ....................... | 335/213 |
| 4,491,962 | 1/1985 | Sakou et al. .......................... | 382/50 |
| 4,494,139 | 1/1985 | Shima et al. ........................ | 358/101 |

*Primary Examiner*—Leo H. Boudreau
*Assistant Examiner*—Donald J. Daley
*Attorney, Agent, or Firm*—Brian J. Wieghaus; James J. Cannon, Jr.

[57] ABSTRACT

In automatic assembly apparatus operating under electronic vision control, features on components to be assembled must be recognized and located in position and orientation so that a gripper mechanism may be directed to one component to pick it up and move it into correct position and orientation relative to the other component for assembly. The invention provides a known parallel projection optical system 8, 9, at the location of each component which provides a plan view for an electronic camera 11 of the components 20, 22 at constant scale regardless of lateral or axial component movements. The grey-level picture of each component provided by the camera is thresholded into a binarized picture at a threshold level which selects a primary component feature 27 within a part of the camera field of view which is certain to contain this feature. From the known location of secondary features 25, 26 and 38, 39, 40 of the component relative to the primary feature, successively limited search areas 35 and 41, 42 are set up within the camera field of view to select these secondary features when thresholded at levels related to the primary threshold. Sufficient features are thereby located in the camera field of view to provide position and orientation information on the component to a computer which directs the gripper 15 to assemble the components.

3 Claims, 16 Drawing Figures

CALIBRATION OPERATION

COMPONENT HAVING
"N" FEATURES

DETERMING LOCATION OF A DU

FLOWCHART FOR SUBROUTINE LODU
FUNCTION: FINDS POSITION AND ANGLE OF A DU
IN THE PUMA PICK UP STATION

FLOWCHART FOR SUBROUTINE POSIT
FUNCTION: FINDS CENTER OF APERTURE 27 IN T.V. COORDINATES

FLOWCHART FOR SUBROUTINE ANGLE
FUNCTION: FINDS THE ANGLE OF A DU, WITH 180° AMBIGUITY, USING EDGES BETWEEN COPPER WINDINGS AND PLASTIC CARRIER.

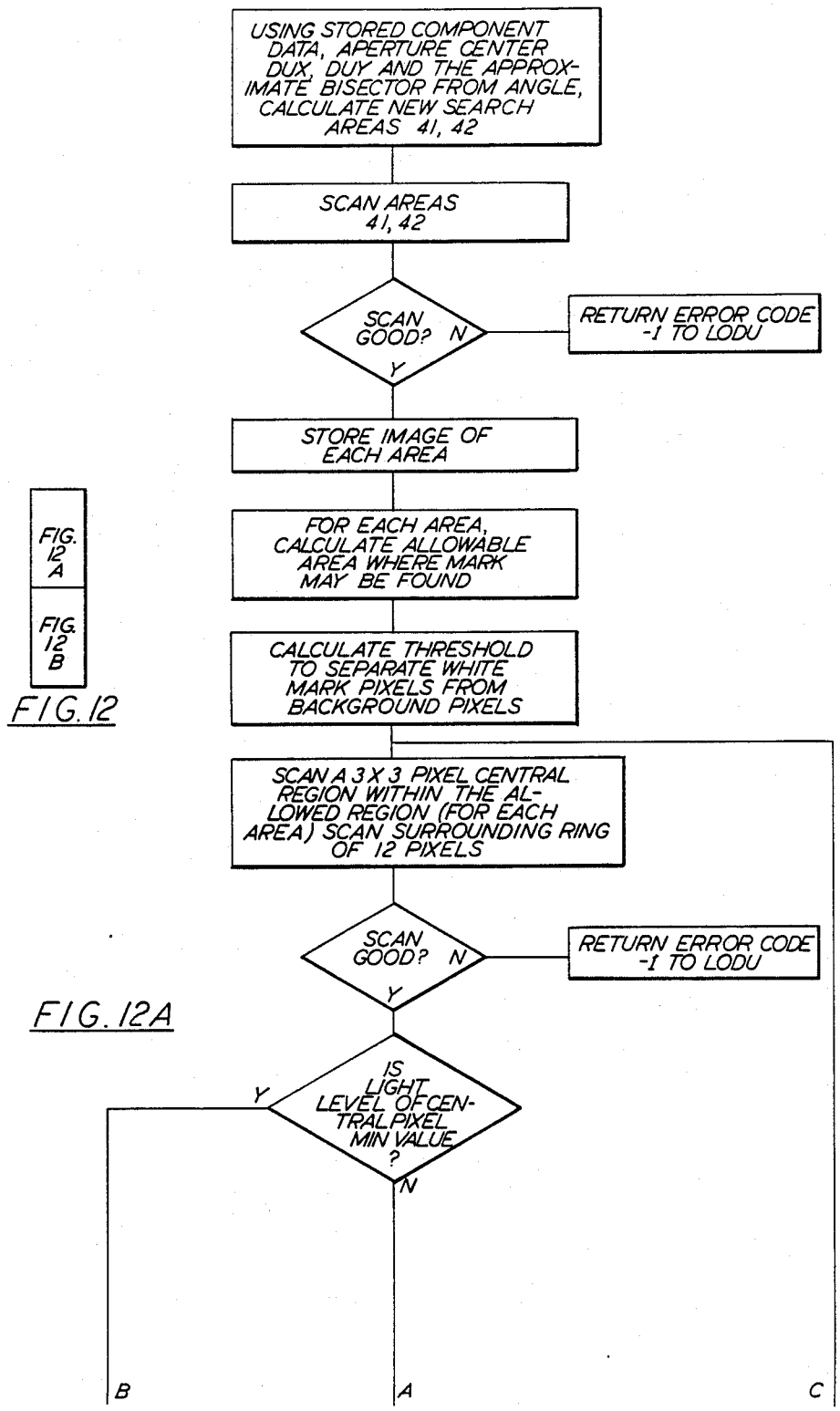

FUNTION: FIND ANGLE OF A D.U. WITH NO AMBIGUITY USING BLIND HOLES 38, 39, 40. BLIND HOLE PAIR 38, 39 AND SINGLE BLIND HOLE 40 EACH CONSTITUTE A "MARK".
FLOWCHART FOR SUBROUTINE POSANG

AUTOMATIC ASSEMBLY APPARATUS

This is a continuation of application Ser. No. 541,947, filed Oct. 14, 1983, now abandoned.

BACKGROUND OF THE INVENTION

The invention relates to automatic assembly apparatus for locating a first component present at a first initial position for assembly with a second component present at a second initial position, said assembly taking place at an assembly position, said apparatus comprising parallel projection means for imaging said first and second components when positioned in respective relative orientations with respect to said respective initial positions, said parallel projection means comprising in order away from the respective component a field lens, an objective lens positioned at the principal focal plane of the field lens, and an electronic camera for receiving a real image of the component formed by the objective lens and for producing a spatially quantized picture signal, said apparatus comprising gripper control means for controlling a gripper to move a component, initially remote from the assembly position, towards the assembly position, said apparatus having futhermore data processing means for receiving said picture signal and for measuring and storing any initial position remote from the assembly position and therefrom calculating movement commands for said gripper control means. Such a system has been published in the article "The application of parallel projections to three-dimensional object location in industrial assembly", by B. M. Jones and P. Saraga, Pattern recognition, Vol. 14 (1981) pp. 163–171. The optical system has in particular been disclosed in U.K. patent application No. 2.065.299A to Applicant, corresponding U.S. patent application Ser. No. 211.554 herein incorporated by reference. The assembly position may be either at the first initial position or at the second initial position, or remote from both initial positions. The second initial position may be also determined by means of the optical system, but alternatively may be known by other means. If the assembly position is remote from both initial positions it may also be determined by means of the optical system, but alternatively may be known by other means. The gripper position may be calibrated by means of the optical system, but alternatively may be known by other means. The gripper motion may also be measured by means of the optical system for generating a feedback quantity, but alternatively this motion may be known by other means. Such other means could be either a rigid structure having invariable dimensions, or intermittent calibration by an operator, or other measuring means such as microwave detectors. The initial positions themselves could be static. Alternatively, one or both of them could be moving, e.g. in that a component is transported on a conveyor belt at uniform speed.

In such vision controlled automatic assembly apparatus it has been the practice to control the appearance of the components to be assembled and/or the lighting conditions so that simple black/white pictres are available. These pictures can be converted relatively easily to binarized pictures by applying a relatively poorly defined threshold level to a video signal provided by the electronic camera which receives an image of the components. The advantage of using parallel optical rays for imaging the component is that the dimensions of the component as represented in the picture signal are independent of the position of the component. It has been found that this allows for greater correctness in determining the component feature positions and threshold levels to be used her inafter. Notably the absence of parallax phenomena will cause the projected dimensions always to be equal to the real dimensions, so that only the limited deviations caused by the optical system itself may cause uncertainties (such as Airy-discs and the elementary diffraction effects caused by their superposition). Note that spatial quantization is conventionally executed according to a regular matrix of pixels. It should also be noted that the parallel projection means may consist of one system for locating both components. This may be feasible in the case of small components, or when the optical system itself can be moved in a calibrated way, for example, if it is mounted on the gripper. Alternatively, there are more parallel projecting systems, one for each component, or even more than one parallel projecting system for one component. The gripper may also be located while it is positioned in the field of any parallel projecting system either for calibration, or, when it is continually monitored while at the assembly position, for purposes of feedback in order to realize still greater accuracy and/or increased speed of assembling.

The expected dimensions of the components can be predetermined and stored in a digital computer. The computer can then be programmed to operate on the binarized information and the stored information identify each component and measure its position and orientation in the binarized picture and hence in the assembly area.

In practical situations it would be an advantage if normal grey-level pictures from the camera could be used. Predetermined features on the component could then be used to identify, position and orientate the component. However if a single threshold level is applied to the video waveform of a grey-level picture, some wanted features are lost and/or unwanted or irrelevant detail appear in the binarized picture.

SUMMARY OF THE INVENTION

The invention provides an automatic apparatus for locating a first component for bringing two components into registration for assembly as described in the opening paragraph of this specification, which is characterized in that said data processing means comprise first thresholding means for thresholding said spatially quantized picture signal of the first component at a first threshold forbinarizing a preselected first partial feature thereof for detecting a first feature location and means for generating, from said first feature location, a secondary search area, said data processing means comprising second thresholding means for thresholding said spatially quantized picture signal within said secondary search area at a second threshold differing from said first threshold for binarizing a preselected second partial feature of said first component for detecting a second feature location, said data processing means being adapted to calculate from said first and second feature locations the orientation and position of said first component and to provide corresponding input signals to said gripper control means. The invention may be particularly advantageous if the respective partial features have different picture signals, which may particularly occur with components of complicated shape, where the detected light signal represents reflected light. The reflected intensity may vary with the distance to the light source, with the inclination of the reflecting surface with respect to the orientation of the light source and the above-mentioned parallel rays, and the color or texture of the reflecting surface. On the other hand, the cited article describes very simple objects such as rings lying on a translucent plane and illuminated from behind. Here, the problems mentioned would hardly occur, especially as the components are mostly rotation symmetric. Another complication necessitating the use of multiple thresholds would be the situation where further objects would throw shadows on the component in question, such as in the case where a multiple layer of components is present in a packing box, from which they must be unpacked one by one and layer by layer.

A primary feature may be provided on the component which is illuminated so as to have a brightness which is either lower or higher than all other component features. A first threshold level can then be chosen which will binarize this feature clear of all other features in the scene. This feature can then be identified and its position and orientation in the binarized picture used as starting point in a search for further features. Such a primary feature could be, for example, a hole through the component which would be illuminated from behind. The associated picture signal would than represent a high brightness level.

Automatic assembly apparatus in accordance with the invention may comprise means for measuring the position of the binarized primary feature in the raster, means for calculating the position and size of a minimum search area within the raster which will contain a secondary feature, said calculating means having as input the measured primary feature position and stored information on the relative positions of both features in the component, means for limiting the video signal to that originating from the search area, means for applying a second threshold to the limited video signal so that the secondary feature has one binary value and the remainder of the search area has the other binary value, and means for calculating the position of the binarized secondary feature in the raster and for calculating the component orientation from the relative positions of the binarized primary and secondary features.

Advantage may be taken of the property of the parallel projection system to provide a plan view of a component which extends along the axis of projection to a considerable extent. The parallel projection system enables the location of an axis, which extends normal to the plane of projection through a feature on the extension to be located. A component of interest which has this property is the essentially conical deflection unit for use with a television cathode ray tube. A circular opening at the apex of the cone is provided to receive the neck of the cathode ray tube.

The invention also relates to a method for machine location of a first component present at a first initial position for later assembly by means of a parallel projection system.

The invention also provides a television set assembly apparatus for assembling a deflection unit onto the neck of a cathode ray tube, said apparatus comprising a first parallel projection system as defined herein at a first location at which the deflection unit is available with its axis substantially parallel to that of the first parallel projection system, second and third parallel projection systems at a second location at which the cathode ray tube is available, the axes of the second and third parallel projection systems being inclined to one another and approximately at right angles to the neck axis, means for thresholding the video signals provided by each parallel projection system at threshold levels chosen to binarize preselected features on the deflection unit and on the neck respectively, means for measuring and storing the positions and orientations of the binarized features relative to their respective rasters, an assembly mechanism fixed relative to said locations and comprising means for moving a deflection unit gripper between the two locations and for rotating the gripper about the deflection unit axis and means for measuring and storing the gripper position and orientation relative to the assembly mechanism, means for attaching a reference object to the gripper at a known offset from the gripper and for moving the reference object into calibration positions in the field of view of the parallel projection systems at each location in turn, means for measuring and storing the position of a binarized image of the reference object in each raster, means for storing the gripper positions relative to the assembly mechanism at each calibration position, means for calculating the gripper orientation and position needed to position the gripper over the deflection unit for gripping and for calculating the gripper rotation and displacement needed to place the gripped deflection unit over the tube neck with axes aligned and with the deflection unit in the correct orientation around the aligned axes, said calculating means having as input said stored features, reference object and gripper positions and orientations, and means for applying said calculated gripper orientation and position and calculated gripper rotation and displacement as movement commands to the assembly mechanism to align the deflection unit over the cathode ray tube neck for assembly by movement towards one another along their aligned axes.

BRIEF DESCRIPTION OF THE FIGURES

Embodiments of the invention will now be described, by way of example, with reference to the accompanying drawings, in which.

DISCLOSURE OF A PREFERRED EMBODIMENT

Figure 1:
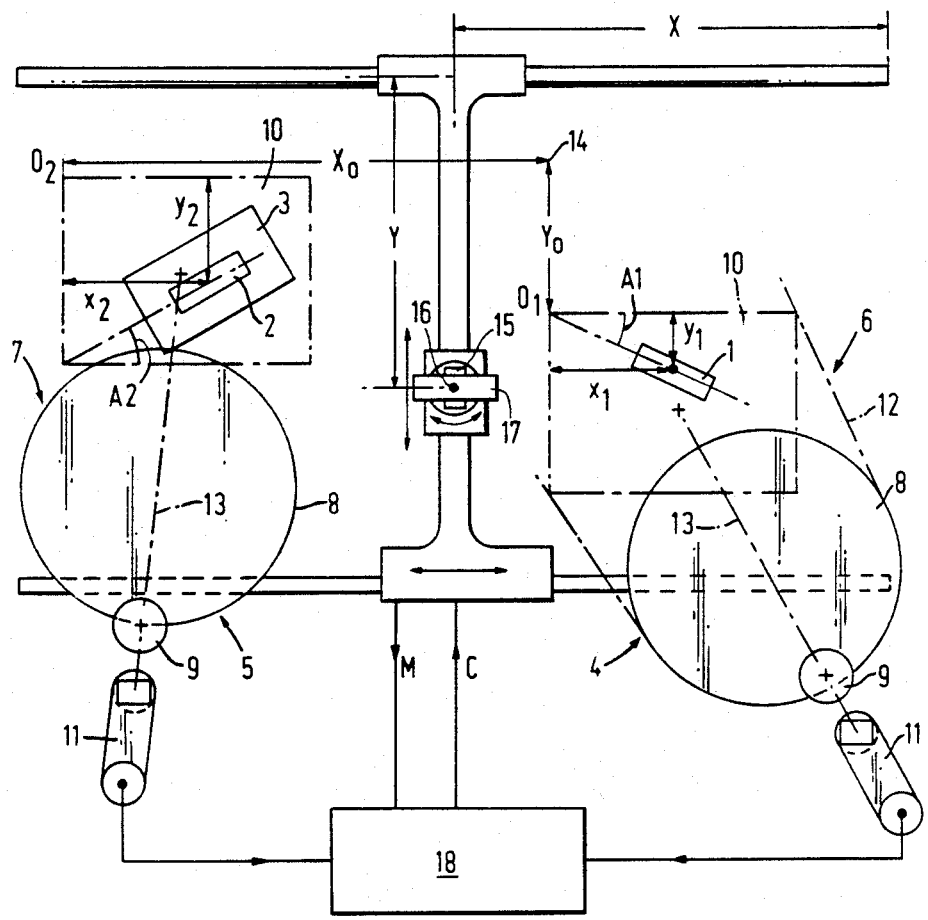
FIG. 1 shows a schematic general purpose automatic assembly apparatus.

Referring to FIG. 1 a first component 1 comprising a rectangular block is to be assembled into a rectangular aperture 2 of a second component 3. Both components lie in parallel planes, parallel to the plane of the drawing, but at different levels. First and second parallel projection systems 4 and 5 are present at first and second locations 6 and 7 containing the first and second components respectively. Each parallel projection system comprises a field lens 8 of diameter equal to that of the area 10 within which a component will always lie. An objective lens 9 is placed at the principal focal plane of field lens 8 and real image of the component area formed by lens 9 falls on the image area of an electronic camera 11, in this case a television camera pick-up tube. The optical operation of the parallel projection system is described in detail in British patent application No. 2,065,229A. In essence, the field lens 8 provides the camera tube 11 with a plan view of all objects lying within a notional parallel-sided tube 12 extending into component space from the edges of the field lens. The direction of this plan view is parallel to the axis 13 of the parallel projection system at all points within the tube. Certain properties of the parallel projection system are used to advantage in the automatic assembly apparatus and these properties will now be given.

* First, there is no change in size of the component image on the camera tube as the component is moved, parallel to itself, across the field of view or along the system axis. Thus the size of a feature on the component can be measured without need to take either the range of the component from the camera or its lateral position into account. Also, a given displacement of the component across the field in view will always be measured as the same value by the camera tube regardless of range. Second, if an object having sides parallel to the system axis is slid across the field of view, the camera image will always show a view of the object straight down its sides and thus will always show the cross-section of this object regardless of range or position across the field of view. A hollow circular tube, viewed in this way, would always be seen as a circular ring of constant diameter and wall thickness. A case of interest is a right circular cone slid across the field of view on its base. The apex of the cone would always be seen centered on the base. This case has features in common with that of the roughly conical deflection unit seen in FIG. 2, being part of a second preferred embodiment. If the tube or cone is to be picked up by a gripper as part of an assembly process for example, the gripper can always be aligned with the component axis since the parallel projection system provides the coordinates of this axis as a line parallel to the system axis. A condition to be observed in obtaining this property is that the component axis is maintained parallel to the system axis as it moves in the field of view of the latter.

The video signal output by the camera 11 is, in general, that of a grey-level picture and is difficult to process in a digital computer. The extraction of information relevant to automatic assembly is greatly eased by binarizing this video waveform. Binarizing methods are described in British patent application No. 2,065,229A. In essence, the television picture is divided into regularly spaced discrete picture elements each having one of only two values according to whether the video signal is above or below a selected threshold value. By a choice of lighting conditions and threshold value, a selected component feature can be binarized clear of all other features in the camera field of view, presenting, for example, an all-white feature set in an all-black background. The feature picture elements can then be stored at correspondingly addressed locations in a computer store.

Such a binarized feature can now be analysed by computer methods. If the feature is a circular patch, for example, the diameter of the feature can be measured as the longest white segment in any line in the raster or as the longest white column of picture elements. The intersection of the perpendicular bisectors of this segment and column give the centre of the circle. If the first component 1 is angular in outline, computer edge-tracing methods are used to find the corners of the feature. The distance between corners can be calculated and used to identify the corners with those of a pre-stored set of corners held in the computer. A reference point $(x_1, y_1)$, and direction $A_1$ can then be identified in the raster of origin $O_1$ evaluated and stored. In like manner the location $x_2$, $y_2$ and orientation $A_2$ of the aperture 2 in the second component 3 can be evaluated in the raster of origin $O_2$ of the second parallel projection system and stored. An earlier method for elementary analysis of a composite objects's image was disclosed in Applicant's U.S. Pat. No. 4.147.930 herein incorporated by reference. An assembly mechanism broadly referenced as 14 is fixed relative to the locations of the parallel projection systems. For brevity, FIG. 1 shows only those elements of the assembly mechanism necessary for explaining the layout of the figure. See also FIG. 2. The assembly mechanism has means for moving a component gripper 15 in a rectangular coordinate system X Y under control of commands C and means for measuring the gripper coordinates. It is to be noted that the word "gripper" should not be construed to form a limitation on the nature of the handling mechanism, which may employ moving fingers or claws, but may also employ suction, magnetism, or any other suitable principle. The gripper can be rotated about axis 16 normal to the assembly plane under commands C to a measured orientation. The gripper position and orientation are provided as measurements M from sensors not shown. The relative positions of the two coordinate systems at the component locations and the origin of the assembly machine coordinate system are determined in a calibration operation. See FIG. 6. A reference object 17, which may be a sample of component 1, is placed in the gripper and moved into the field of view of each parallel projection system in turn. The image of the reference object is binarized at each location and the position of a preselected reference point, offset by a known amount from the gripper center, is measured in the coordinate system at each location. The gripper coordinates X, Y are simultaneously measured at each location. Hence the separation $X_0$, $Y_0$ of the origins $O_1$ and $O_2$ can be calculated and also their positions in the coordinate system X Y of the assembly mechanism.

Figure 5:
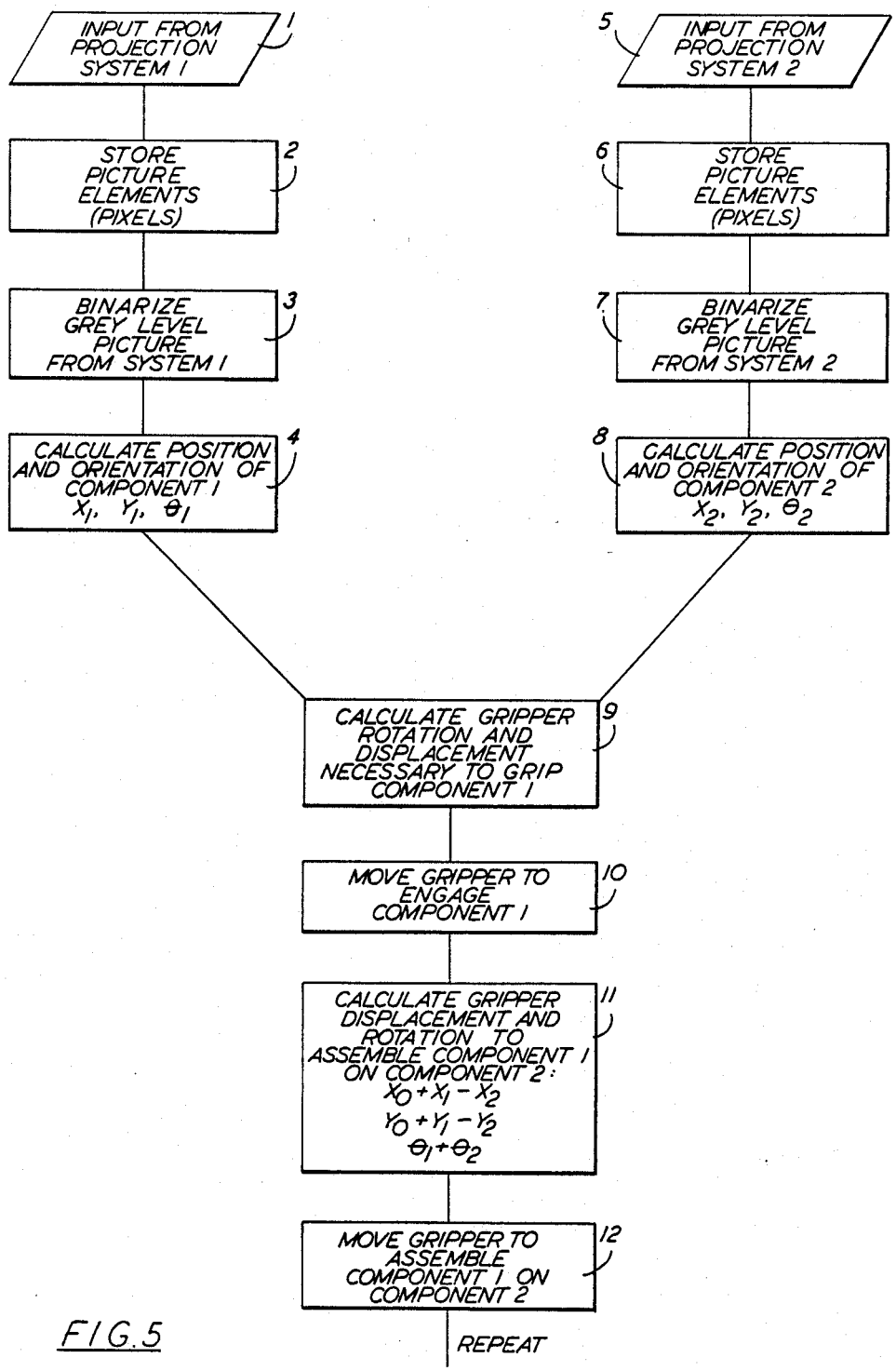
FIG. 5 gives an elementary block diagram for the automatic assembly apparatus showing image pickup through gripper commands.
Figure 6:
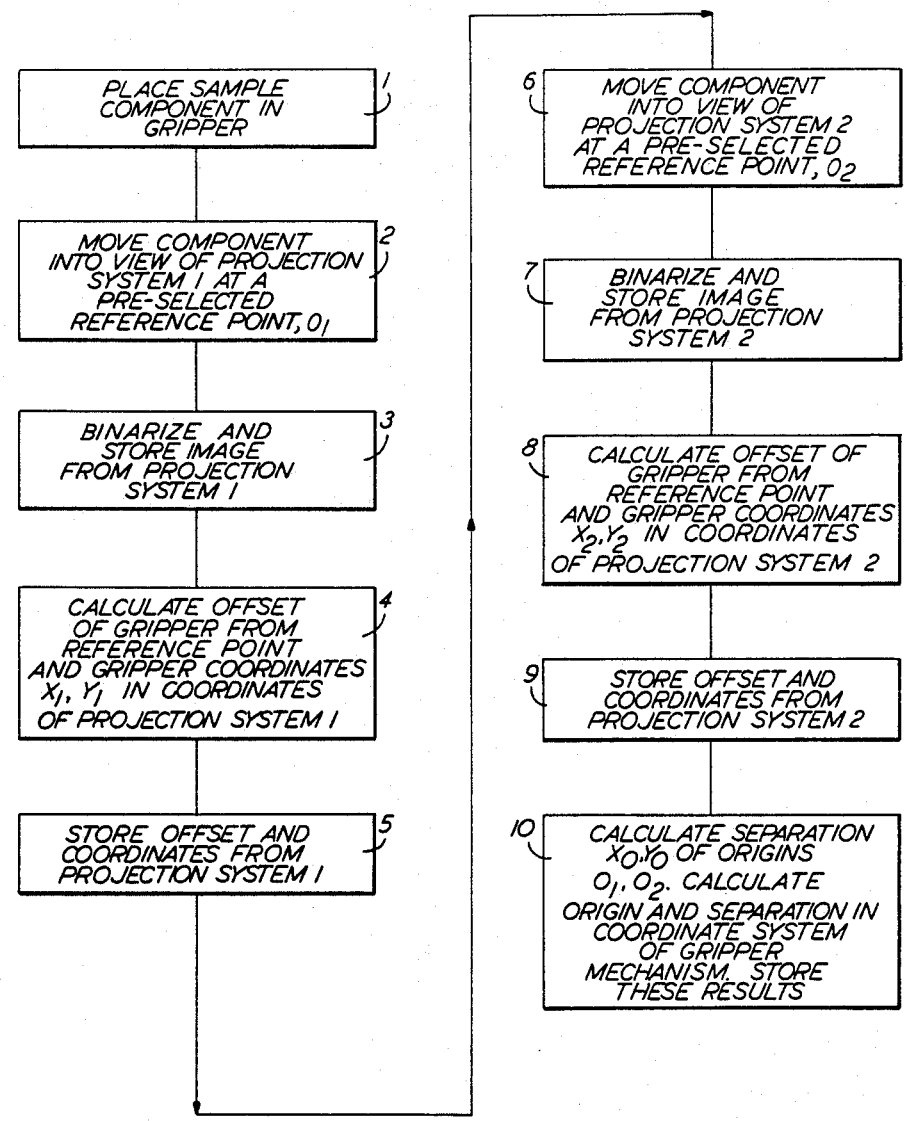
FIG. 6 shows an elementary block diagram for a representative calibration operation.

The assembly operation can now be carried out. From the stored information obtained during the calibration operation and during the measurement of the two component orientations and positions in their respective rasters, the computer 18 calculates the gripper orientation and position needed to position gripper 15 over the first component for gripping. The gripper rotation $A_1+A_2$, and the displacements $X_0+x_1-x_2$ and $Y_0+y_1-y_2$ needed to place the first component over the second component are now calculated and input as movement commands C to the assembly mechanism. FIG. 5 shows the above operation from a projection system input through generation of gripper commands. The data from the calibration procedure of FIG. 6 is used in blocks 9, 10, and 11 of FIG. 5.

Figure 2:
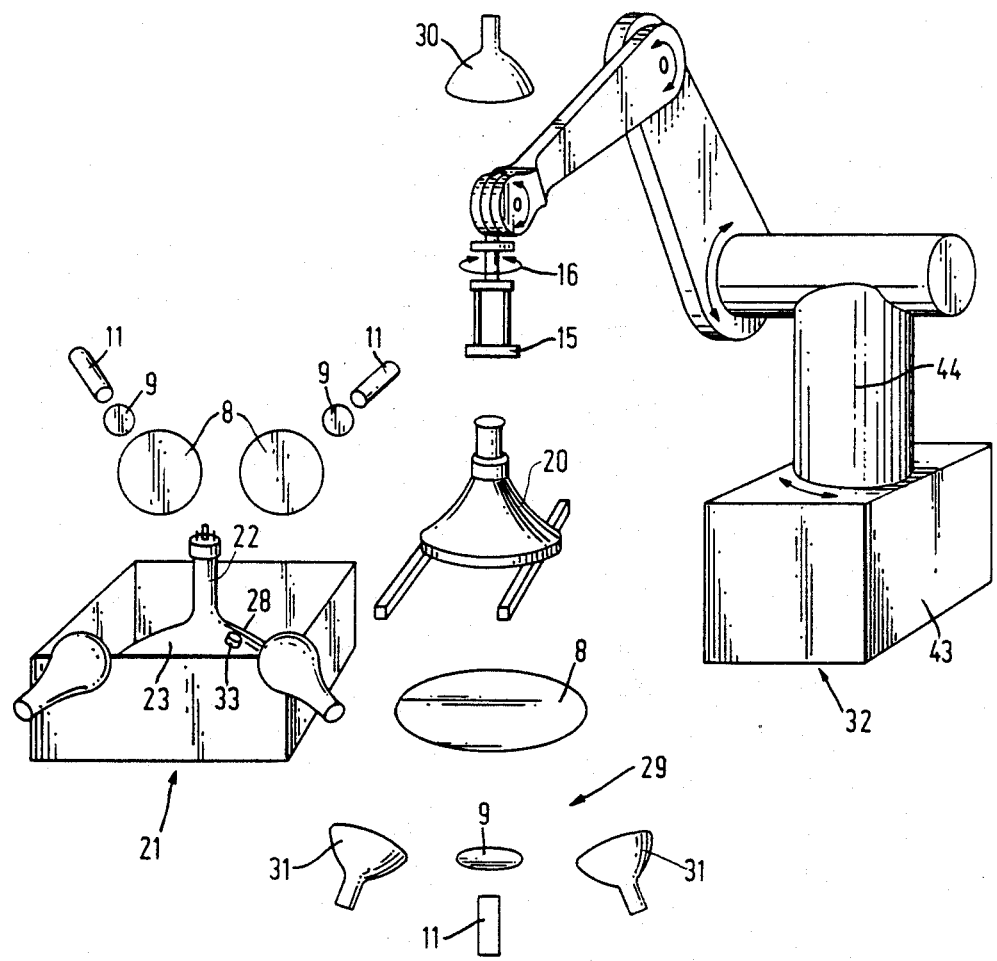
FIG. 2 shows a schematic automatic assembly apparatus for placing a deflection unit of a television set around the neck of a cathode ray tube.

FIG. 2 shows an automatic assembly apparatus for placing a deflection unit 20 of a television set 21 around the neck 22 of the cathode ray tube 23 of the set. This apparatus employs the same principle as the general purpose assembly apparatus of FIG. 1, differing from it only in the detail layout needed to view the deflection unit and the relevant features on it, in that two parallel projection systems are used at the second location to provide three-dimensional information on the neck position, and in that a commercially available robot, type PUMA 560, made by Westinghouse-Unimation Corporation, Dansbury, Conn., USA, provides the function of assembly mechanism 14.

Figure 3:
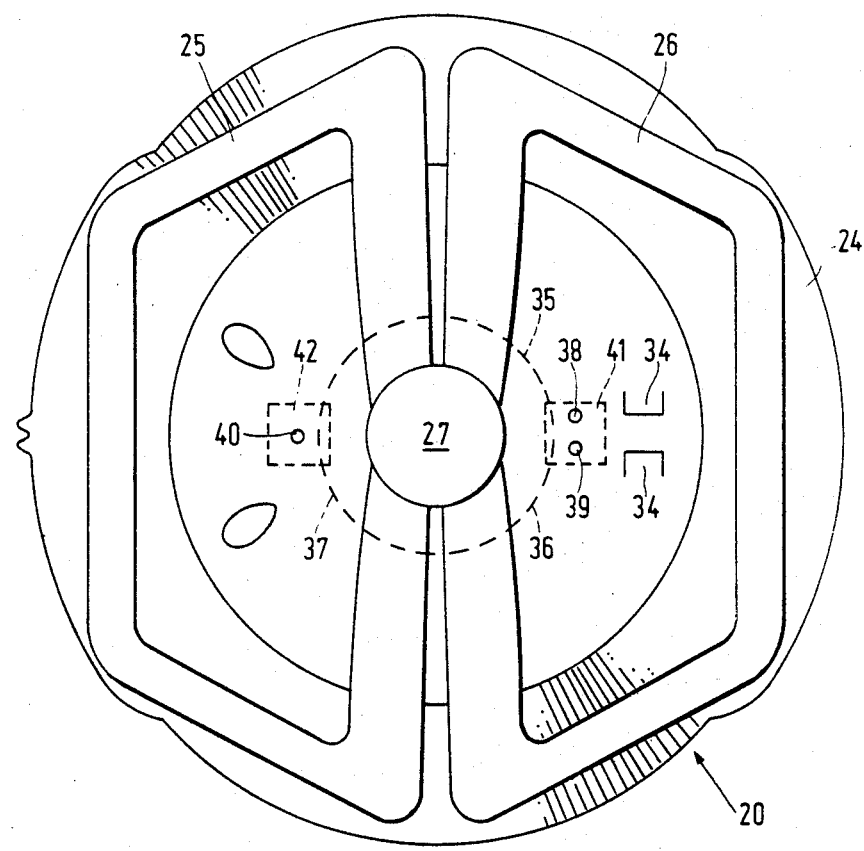
FIG. 3 shows a view of a deflection unit of FIG. 2 looking into the conical former and showing the features and search areas used in automatic assembly.

The arrangements at the first location will now be described. FIG. 3 shows the underside plan view of the deflection unit (D.U.) 20. The unit 20 comprises a conical light grey plastics moulding 24 to which two multiturn coils 25 and 26 are attached. Circular aperture 27 fits around the neck 22 of the tube 23, the coils 25 and 26 on the inner conical surface of moulding 24 resting against the sloping shoulders 28 of the tube. The coils 25 and 26 pass up along the walls of aperture 27 completing the circuit as two saddle shaped windings around the parallel-sided part of the neck 22. The parallel projection system 29 at the location where the deflection unit is available for assembly is mounted to look up into the conical inside of deflection unit 20 with its optical axis parallel to the mechanical axis of the deflection unit. The parallel projection system comprises field lens 8, objective lens 9 and television camera tube 11 as in FIG. 1. Lighting source 30 is arranged above D.U. 20 and is placed to send collimated light down the axis of D.U. 20. The collimator, although not required in principle, greatly increases the lighting efficiency. The collimator has not been shown as a separate element. Thus, by commanding the robot 32 to move gripper 15 clear of the D.U. axis the aperture 27 can be brightly illuminated relative to the remainder of the inside of the D.U. Thus a relatively high threshold value can be selected for the video signal from camera 11 at the D.U. location which will binarize aperture 27 leaving computer 18, not shown in FIG. 2, with the task of finding the center of a single circular patch. Computer 18 is also programmed to measure the diameter of the circular patch, compare it with a stored expected diameter of the patch, and to adjust the threshold to equalize the measured and stored diameters. In this situation, where the feature is more brilliant than its surroundings, a higher threshold will tend to diminish the measured dimension. The center of this equalized measured diameter is used to define the values corresponding to $x_1, y_1$ in FIG. 1.

The orientation of the D.U. around the tube neck is critical to the performance of the television set. To define this orientation closely a ceramic peg 33 is fused to the CRT shoulder in a precisely defined position relative to the electron gun and tube mask. Peg 33 engages as a close fit between shoulders 34 on the inside of the moulding 24. The orientation of these shoulders about the D.U. axis at the D.U. location is determined as follows.

Once the D.U. axis has been located at the D.U. location, a first search area 35 is set up in the computer 18 as a single circle of picture elements centered on the D.U. axis, all other picture elements in the raster being ignored. Illumination is provided from below by sources 31. These sources illuminate the deflection unit 20 directly, without the light first going through field lens 8. The camera video signal is now thresholded at a new and lower threshold level for discriminating among levels of reflected light. This binarizes the windings 25 and 26 at one value and the moulding at the other value. Here again the lowering of the threshold level tends to diminish the dimensions of the darker parts of the feature. Thus, the ends of the two largest continuous arcs 36, 37, i.e. the positions where they intersect the image of windings 25, 26, can now be located and also a perpendicular bisector generated which points roughly in the direction of shoulders 34. This is not sufficiently accurate in itself and also a 180 degree ambiguity is evident. To improve accuracy and resolve the ambiguity three blind holes are cast into the moulding at the same time as the shoulders 34 and in positions related accurately to the shoulder positions and orientation. Two of the blind holes 38, 39 are cast near the shoulders 34 and one hole 40 is remote from them. It is arranged that a line drawn through the center of hole 40 and bisecting the line between holes 38 and 39 passes accurately midway between shoulders 34. Once the perpendicular bisector of the arcs 36 and 37 has been located, two secondary search areas 41 and 42 of the minimum size are set up to surround the known likely sites of the blind holes. The threshold is now set at a third value likely to binarize the blind holes against the background of the secondary search areas. If the areas of the two secondary search are equal, the ratio of hole area to search area in one will be different to that in the other allowing the ambiguity to be resolved. The bisector of the binarized holes now provides the D.U. orientation with sufficient precision for assembly. The threshold level in the secondary search areas is also adjusted to bring the aforementioned ratios to an expected value, thereby improving the accuracy of hole location, and hence of D.U. orientation. The advantages of thresholding only small search areas such as 41 and 42 and ignoring the remainder are various. If the thresholding itself is done serially, appreciable processing time would be saved. Also if some calculation on the binarized values must be effected, their lower number would lead to greater speed. And finally, if some overall quantity were to be calculated for the search area, such as the ratio of "black" versus "white" points, the sensitivity of tis criterion when using a small number of points would be greater.

In certain situations or applications an even longer string of searches for partial features may be advantageous.

At the second location, that is the CRT location, two parallel projection systems are used with optical axes inclined to one another and at right angles to the CRT neck axis which is also the assembly axis. Not only can the transverse position $x_2, y_2$ be located but the vertical position of the end of the neck can be located. Thus, during the calibration procedure not only is the separation X, Y between the origins of the two coordinates axes at the two locations determined but a vertical reference is established which allows variations in neck length to be taken into account when the vertical travel for assembly is calculated.

Figure 4:
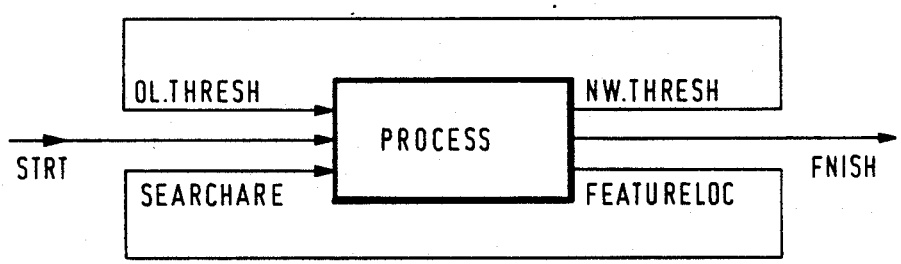
FIG. 4 gives an elementary block diagram of the determination of successive features.
Figure 7:
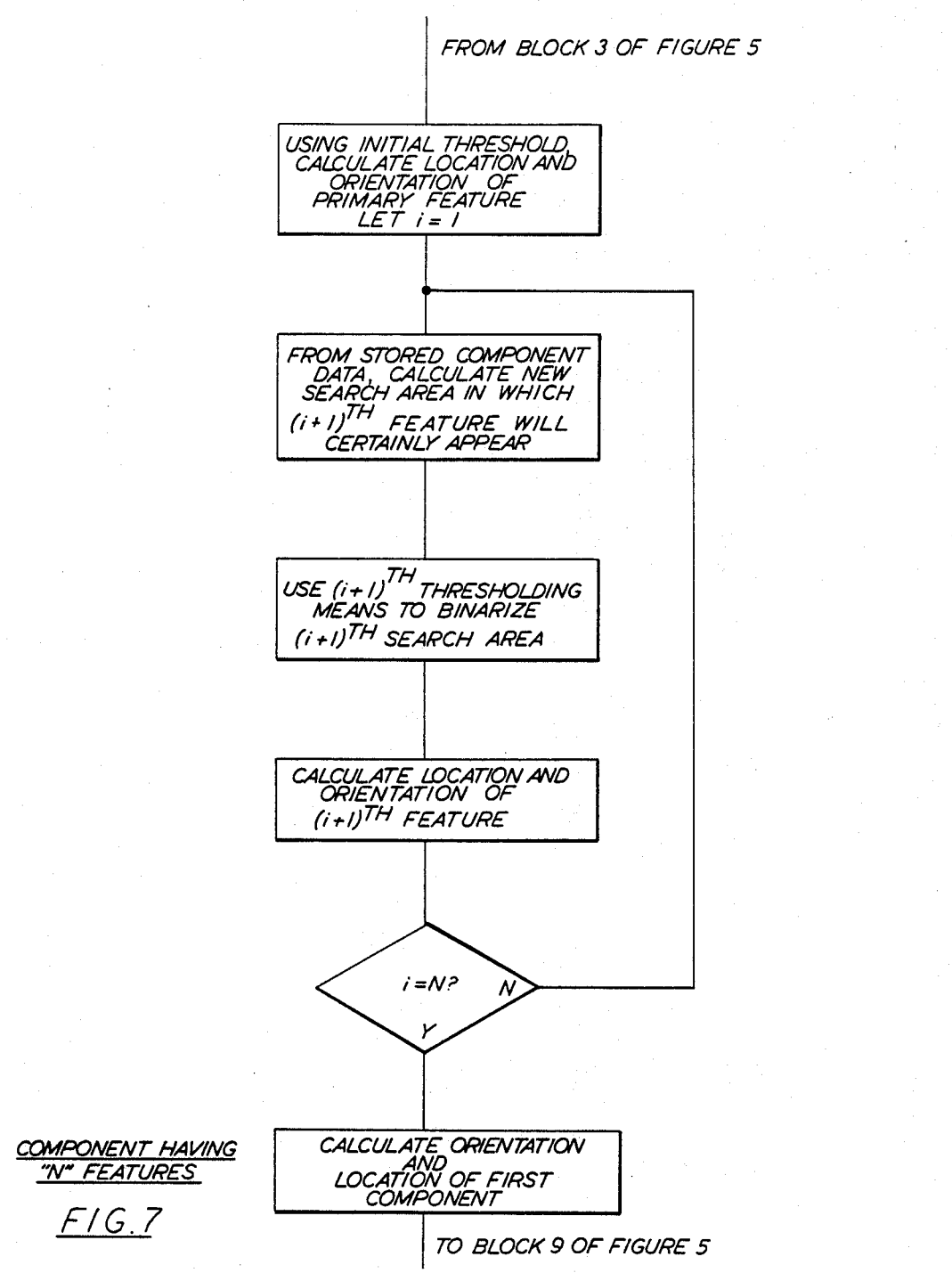
FIG. 7 shows a block diagram for determining component position and orientation for a component having more than one feature. This is descriptive of block 4 of FIG. 5.
Figure 8:
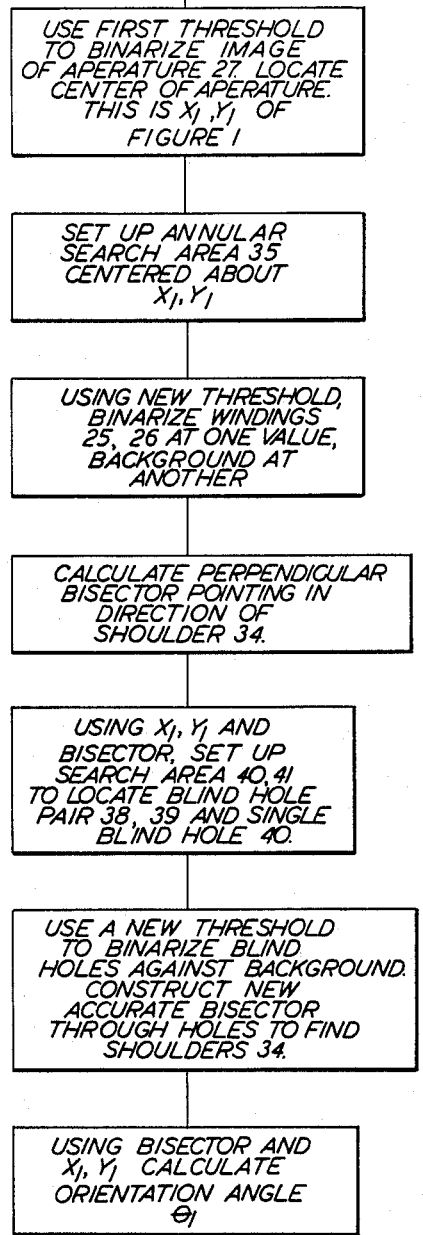
FIG. 8 shows a block diagram for determining the position and orientation of a deplacement unit (DU). This is descriptive of block 4 of FIG. 5.

By way of further clarification, FIG. 4 gives an elementary block diagram of the determination of successive features. The central block is the recognition and measuring process. This is entered from the ST(A)RT at left. The entries are an initial threshold and the whole picture signal. If the search is not successfull, a N(E)W THRESH(OLD) may be determined, to be entered again at left. If the search is successfull, at the right exit the FEATURE LOC(ACTION) results. This defines a new SEARCH ARE(A) at left, with a modified threshold value to be entered also. If the string of partial features is found correctly, the process exits to F(I)NISH, yielding the successive locations. FIG. 7 shows a more complete block diagram for determining location and orientation of a component having successive features. It is an iterative process. For brevity, the exit in case of failure has not been shown separately. The various thresholds may be fixed, or they could be determined by a learning process. In themselves, learning processes are well known.

Hereinafter a description is given of the procedures used in the process, notably in the vision part of the D.U. pick-up. They have been written in the language RTL2. The following subroutines are listed:

| (a) SUBROUTINE | LODU |
|---|---|
| PURPOSE | To find the position and angle of a DU in the PUMA pick-up station. |
| RTL/2 SPECIFICATION VARIABLES | PROC(REF INT DUX, DUY, REF REAL DUA) INT LODU ; DUX: X-position of DU, as a TV coordinate. DUY: Y-position of DU, as a TV coordinate. DUA: angle of DU, in degrees, using polar coordinate conventions. ERROR CODES: 0 if DU found 1 if waiting for DU to arrive −1 if failed and cannot recover |
| SUBROUTINES PROCEDURE | CALLED BY LODU: POSIT, ANGLE, POSANG 'LODU' is an outer procedure which calls, in sequence:    'POSIT' - find position of DU       'ANGLE' - find approx. angle of DU, with ambiguity    'POSANG' - find exact angle with no ambiguity The process is as follows: (1) Find the DU position. If no DU, return 1. (2) Find the DU position again. If the DU has moved more than 1 mm, go back to process step (1). (3) Find the DU angle. |
| RTL/2 EXAMPLE | WHILE LODU(X,Y,A) = 1 DO    <<wait>> REP ; |

Figures 9, 9A:
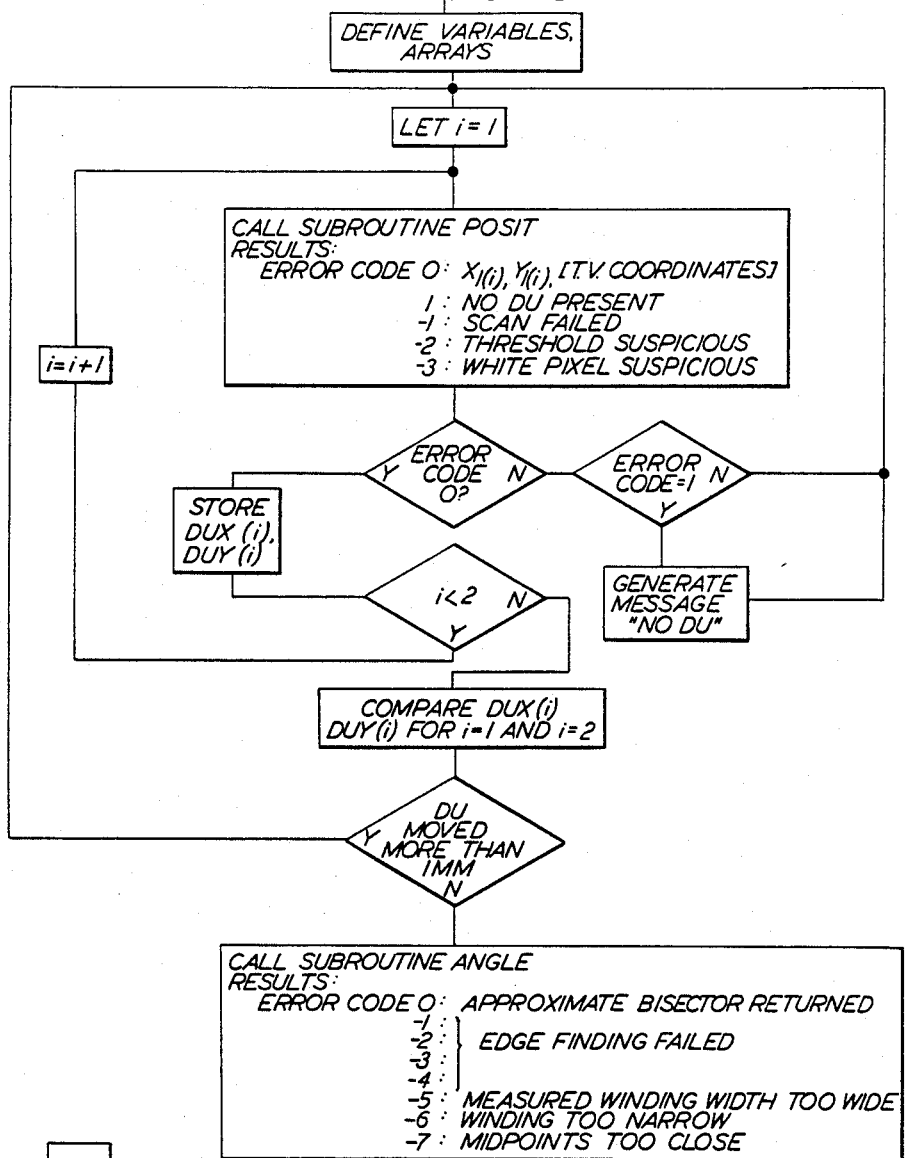
FIG. 9 is a representative flowchart for Subroutine LODU, which is used in the preferred embodiment of the invention.
Figure 9B:
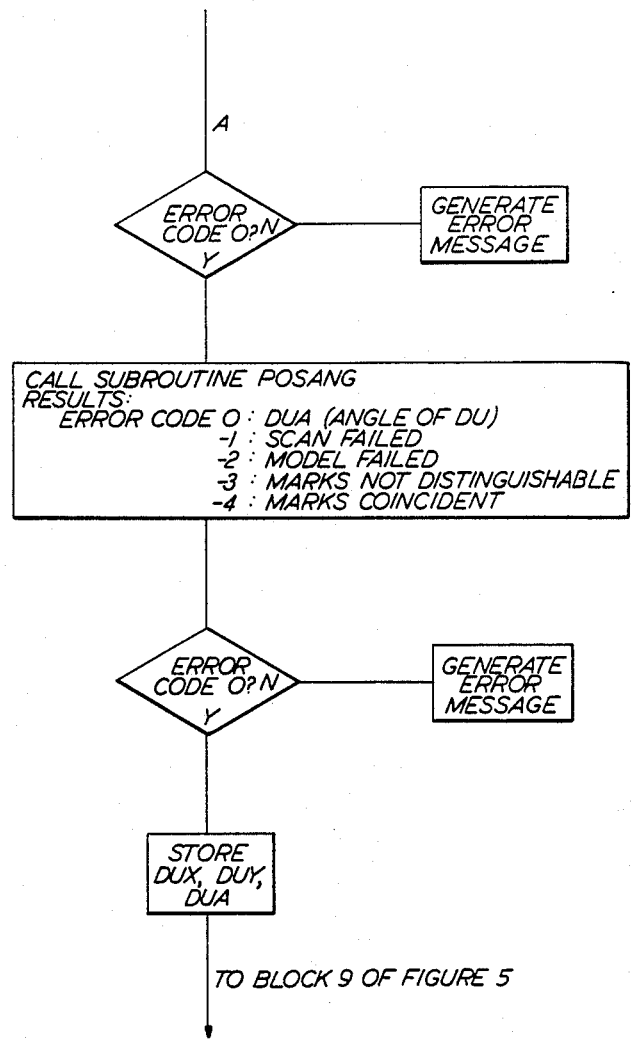

FIG. 9 shows the flowchart for Subroutine LODU. The subroutine calls Subroutine POSIT which determines the position of center of aperture 27. LODU calls POSIT again to check if the component has moved more than 1 mm. POSIT is repeatedly called until a component is imaged which does not move. LODU then calls Subroutine Angle which determines an approximate orientation angle for the component. Subroutine POSANG is then called by LODU to scan search areas 41,42, determine an exact orientation angle and resolve th 180° ambiguity.

| (b) SUBROUTINE | POSIT |
|---|---|
| PURPOSE | To find DUX, DUY |
| RTL/2 SPECIFICATION | PROC()INT POSIT ; |
| VARIABLES | DUX, DUY ERROR CODES: 0 if DU found 1 if no DU present −1 if scan failed −2 if threshold value is suspicious −3 if a white pixel position is suspicious (−2 & −3 could mean a moving DU, cr foreign object.) |
| PROCEDURE | 'POSIT' finds the position of a DU, in TV coordinates, using the central hole through which the CRT neck passes. The process is as follows: (1) A scan is made which encompasses the central hole. (2) The histogram of light levels is formed. (3) The width of the histogram is checked against a minimum value. If the histogram is too narrow, then this indicates that no DU is present, and 1 is returned. (4) From the histogram population, a threshold is found which splits off the number of white |

| | |
|---|---|
| | pixels corresponding to the hole, the scaling factors being known. The hole pixels can thus be isolated.<br>(5) The calculated threshold is checked to lie within an expected range. If it is outside this range, then −2 is returned.<br>(6) The centre of gravity of the hole pixels is found. If a white pixel is found which lies outside an expected region, then −3 is returned.<br>(7) The TV coordinates of the hole centre are put into DCENX and DCENY in databrick DEFRES. |
| RTL/2 EXAMPLE | IF POSIT( ) = THEN % SUCCESS %<br>END ; |

Figure 10:
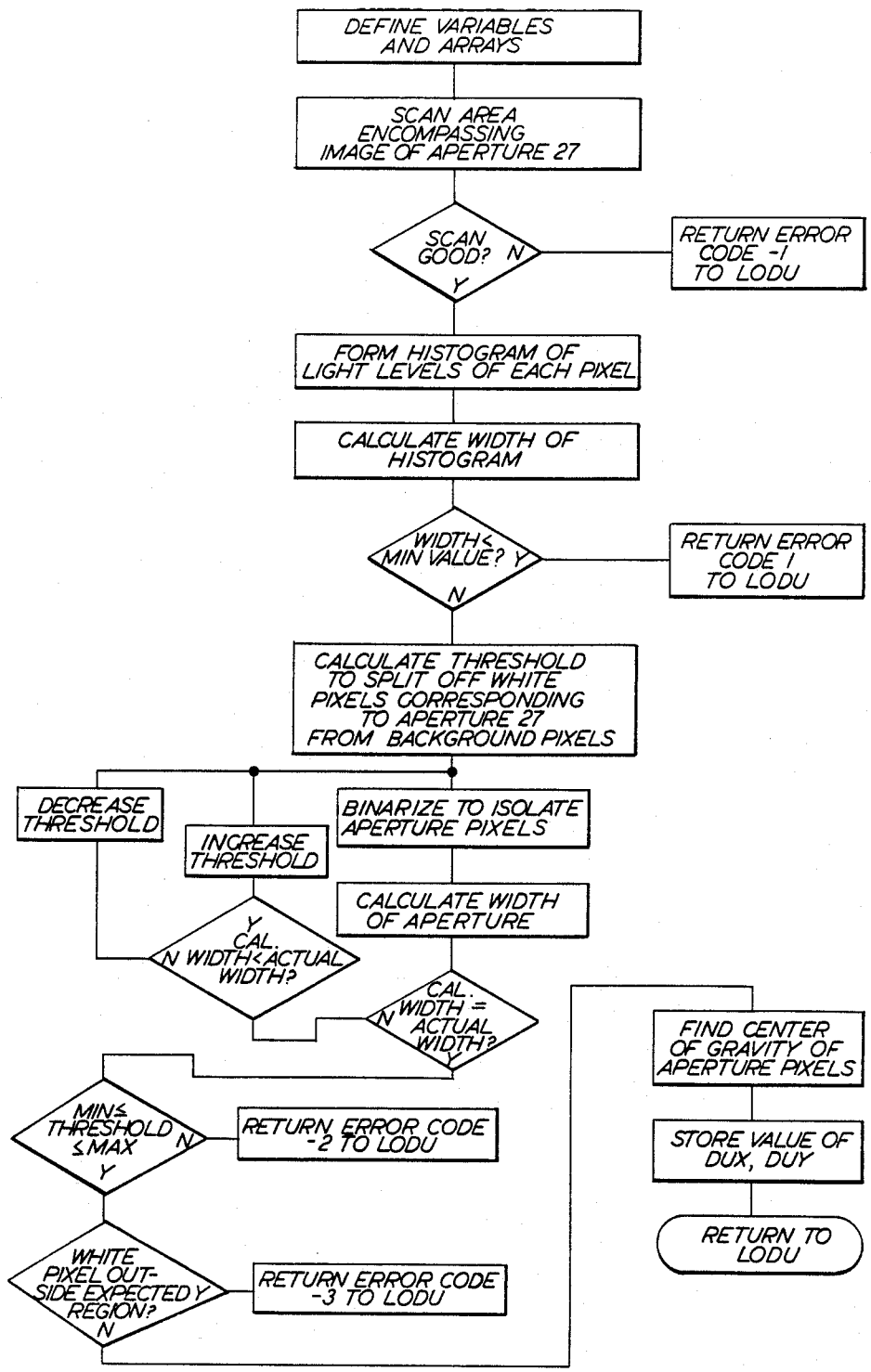
FIG. 10 is a representative flowchart of Subroutine POSIT, which is called by Subroutine LODU. It calculates the position of the DU.

FIG. 10 is a flowchart for Subroutine POSIT. The area encompassing the image of aperture 27 is scanned and a histogram is formed. The width of the histogram is checked to see if a component is present. The setting of the initial value for the threshold can be calculated from the histogram or a set value can be used. See previously cited U.K. patent application No. 2,065,299A Jones et al, page 5, lines 35-45. The value of the threshold is checked and the image is checked to see if any white pixels lay outside the expected region. Finally, the location of the center of the aperture is calculated using the center of gravity of the pixels.

Figure 11:
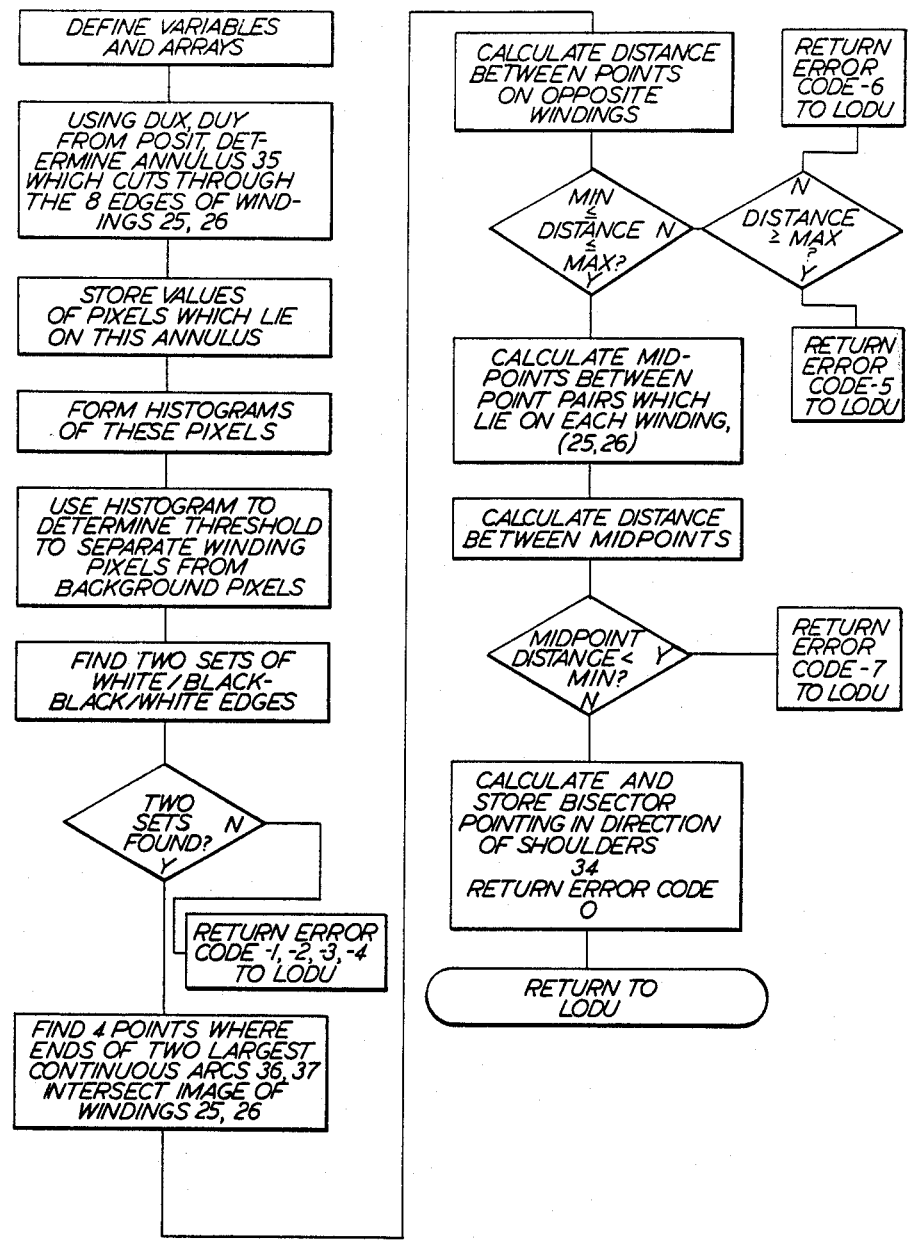
FIG. 11 is a representative flowchart of Subroutine ANGLE, which is called by Subroutine LODU.

FIG. 11 shows the flowchart for Subroutine Angle. The flowchart is easily understood in conjunction with the procedure discussed above. The subroutine finds the coil positions 25,26 by finding two sets of black/white—whilte/black edges which lie on the scanned annulus 35. Other edge tracing methods may be suitable for different components. For edge tracing methods see previously cited "The application of parallel projections to three-dimensional object location in industrial assembly", by B. M. Jones and P. Saraga, Pattern Recognition, Vol. 14 (1981) pp. 168.

| | |
|---|---|
| (c) SUBROUTINE<br>PURPOSE | ANGLE<br>To find the approxixate angle of a DU, wth a 180 degree ambiguity. |
| RTL/2 SPECIFICATION<br>VARIABLES | PROC( ) INT ANGLE ;<br>DUX, DUY<br>Approximate value for DUA;<br>ERROR CODES<br>0 if successful<br>−1, −2, −3 or −4 if edge-finding failed<br>−5 if measured winding width is too narrow<br>−6 if measured winding width is too wide<br>−7 if midpoints are too close |
| PROCEDURE | 'ANGLE' finds the angle of a DU, with a 180 degree ambiguity, using the edges between the copper windings and the plastic carrier. The process is as follows:<br>(1) Find a circular annulus, centred on the hole centre of gravity (found by POSIT), which cuts through the required edges.<br>(2) Store the values of the pixels which lie on this annulus.<br>(3) Form the histogram of light values for the annulus pixels.<br>(4) Use the histogram to determine a threshold which separates the winding from the carrier.<br>(5) Find 2 sets of white/black black/white edges.<br>(6) Use these to determine the DU orientation. There will be a 180 degree ambiguity because of the symmetry of the winding pattern. |
| RTL/2 EXAMPLE | IF ANGLE ( ) = 0 THEN % SUCCESS %<br><<procedure>><br>END ; |

| | |
|---|---|
| (d) SUBROUTINE<br>PURPOSE<br>RTL/2 SPECIFICATION<br>VARIABLES | POSANG<br>To find the exact angle of a DU, with no ambiguity.<br>PRO( )INT POSANG ;<br>DUX, DUY<br>Approximate value for DUA<br>Exact value for DUA ;<br>ERROR COD:<br>0 if successful<br>−1 if scan failed |

|  |  |
|---|---|
|  | -continued |
|  | −2 if model failed |
|  | −3 if marks are indistinguishable |
|  | −4 if marks are coincident |
|  | (−4 is unlikely, but is included for completeness.) |
| PROCEDURE | 'POSANG' finds the angle of a DU, with no ambiguity, using the two marks provided for that purpose. One mark is blink hole pair 38,39 and the other mark is blind hole 40. |
|  | The process is as follows: |
|  | For each of the 2 marks: |
|  | (1) Calculate the scan position, so as to encompass the mark. |
|  | (2) Scan the mark. |
|  | (3) Find the high value corresponding to the background. |
|  | (4) Run a model over the stored image to locate the mark. The model compares the average light level for a 3 by 3 pixel central region with the average light level for a surrounding ring of 12 pixels. If the difference is greater than 'PXCRIT', then the model position indicates a mark pixel. Not all model positions are tested fully; if the central pixel is too light, then the test is by-passed. Also, an allowed region is calculated, and models are not positioned outside this region. |
|  | (5) Sum the light levels in a 3 by 3 pixel region centred on the mark's centre of gravity. |
|  | Then: |
|  | (6) Compare the pixel summations from (5), and decide which is the single mark, and which is the double mark. |
|  | (7) Calculate the DU angle, and put it into WDANG in databrick DEGRES. |
| RTL/2 EXAMPLE | IF ANGLE ( ) = 0 THEN % SUCCESS % |
|  | <<procedure>> |
|  | END ; |

Figure 12B:
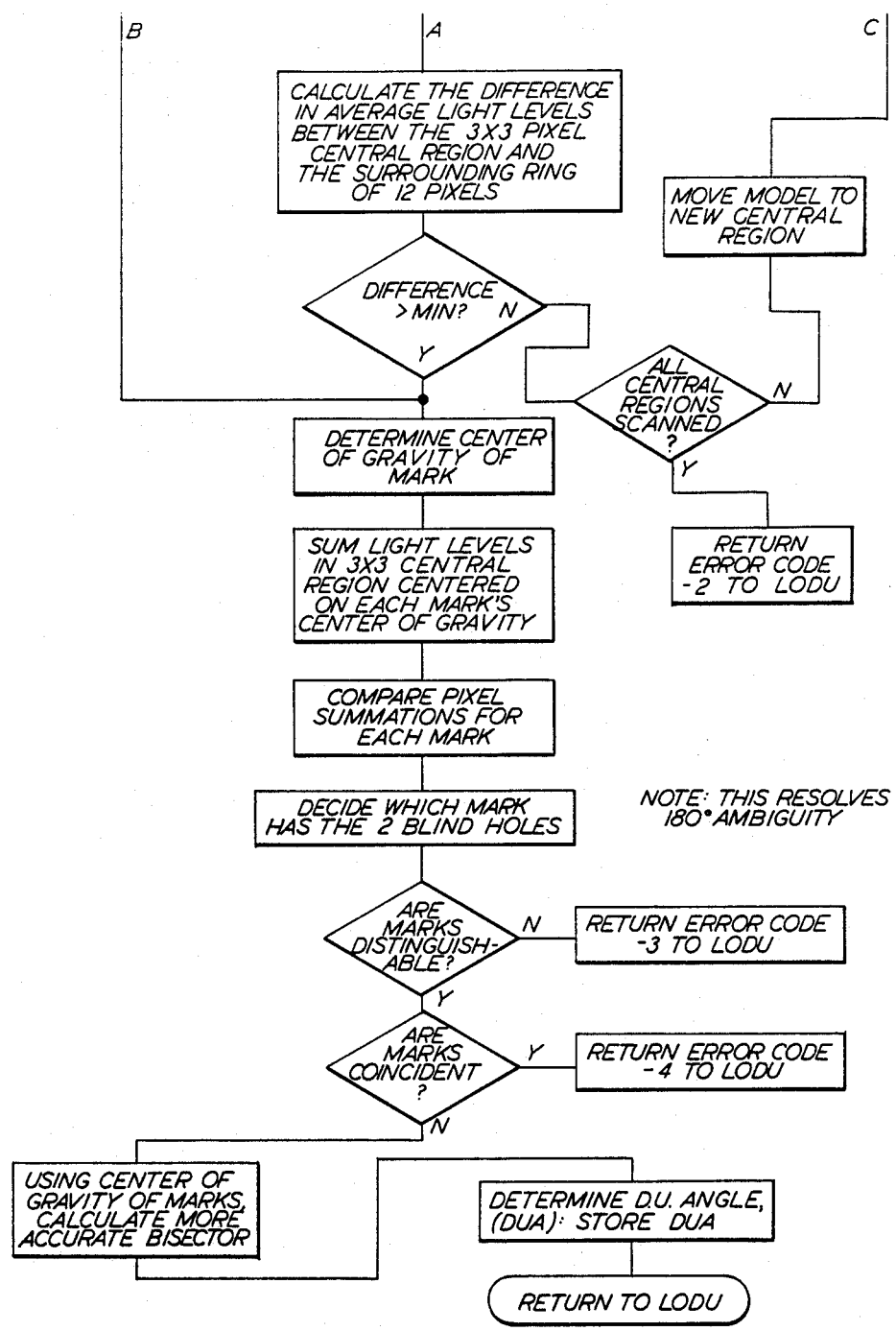
FIG. 12 is a representative flowchart of Subroutine POSANG, which is called by Subroutine LODU. It calculates the angle of the DU, without ambiguity.

FIG. 12 shows the flowchart for Subroutine POSANG. The flowchart closely follows the procedure listed above.

We claim:

1. Automatic apparatus for locating a first component present at a first initial position for assembly with a second component at an assembly position, said apparatus comprising: parallel projection means for imaging said first and second components as positioned, said parallel projection means comprising in order away from the respective component a field lens, an objective lens positioned at the principal focal plane of the field lens, and an electronic camera for receiving a real image of the component formed by the objective lens and for producing a spatially quantized picture signal, said apparatus comprising gripper control means for controlling a gripper to move the first component to the assembly position, said apparatus having furthermore data processing means for receiving said picture signal, for applying a threshold level to said signal to produce a binarized signal representing a component, and for measuring and storing any binarized component position and therefrom calculating movement commands for said gripper control means, characterized in that:

the first component comprises a succession of spatially separate illuminated features at predetermined locations and of predetermined dimensions in the component, a primary feature having a brightness which is either lower than or higher than the brightness of all other features in the succession, in that said data processing means comprise first thresholding means for thresholding said spatially quantized picture signal of the first component at a first threshold for binarizing the primary feature at one binary value and all other features at the other binary value for measuring the primary feature location and means for generating, from said primary feature location and from the predetermined locations of the features, a minimum second search area in which the next feature in the succession will be present, said data processing means comprising second thresholding means for thresholding said spatially quantized picture signal within said minimum secondary search area at a level between the brightness of the next feature and of its adjacent background for binarizing the next feature for measuring the next feature location, said data processing means comprising means for applying a corresponding sequence of thresholds and measuring means for each further feature in the succession, said data processing means being adapted to calculate from the succession of feature locations so obtained the orientation and position of said first component and to provide corresponding input signals to said gripper control means.

2. Automatic apparatus for locating a first component present at a first initial position for assembly with a second component at an assembly position, said apparatus comprising parallel projection means for imaging said first and second components as positioned, said parallel projection means comprising in order away from the respective component a field lens, an objective lens positioned at the principal focal plane of the field lens, and an electronic camera for receiving a real image of the component formed by the objective lens and for producing a spatially quantized picture signal, said apparatus comprising gripper control means for controlling a gripper to move the first component to the assembly position, said first component comprising a plurality of spatially separate illuminated features at predetermined locations and of predetermined dimensions in the component, a primary feature having a brightness which is either lower than or higher than the brightness of all other features on the component, said apparatus having furthermore data processing means for thresholding said spatially quantized picture signal of the first component at a first threshold for binarizing the primary feature at one binary value and all other features at the other binary value for measuring the primary feature location, for generating, from said primary feature location and from the predetermined locations of the features, a minimum second search area in which the next feature in the succession will be present, for thresholding said spatially quantized picture signal within said minimum secondary search area at a level between the brightness of the next feature and of its adjacent background for binarizing the next feature for measuring the next feature location, for applying a corresponding sequence of thresholds to locate each further feature in the succession, for storing any binarized component position, and for calculating from the succession of feature locations so obtained the orientation and position of said first component and to provide corresponding input signals to said gripper control means.

3. Automatic apparatus for locating a first component present at a first initial position for assembly with a second component at an assembly position, said apparatus comprising parallel projection means for imaging said first and second components as positioned, said parallel projection means comprising in order away from the respective component a field lens, an objective lens positioned at the principal focal plane of the field lens, and an electronic camera for receiving a real image of the component formed by the objective lens and for producing a spatially quantized picture signal, said apparatus comprising gripper control means for controlling a gripper to move the first component to the assembly position, said first component comprising a plurality of spatially separate illuminated features at predetermined locations and of predetermined dimensions in the component, a primary feature which is more easily located than the other features, said apparatus having furthermore data processing means for thresholding said spatially quantized picture signal of the first component at a first threshold for binarizing the primary feature at one binary value and all other features at the other binary value for measuring the primary feature location, for generating, from said primary feature location and from the predetermined locations of the features, a minimum second search area in which the next feature in the succession will be present, for thresholding said spatially quantized picture signal within said minimum secondary search area at a level between the brightness of the next feature and of its adjacent background for binarizing the next feature for measuring the next feature location, for applying a corresponding sequence of thresholds to locate each further feature in the succession, for storing any binarized component position, and for calculating from the succession of feature locations so obtained the orientation and position of said first component and to provide corresponding input signals to said gripper control means.

* * * * *